United States Patent
Huang

(10) Patent No.: US 6,174,090 B1
(45) Date of Patent: Jan. 16, 2001

(54) WHEEL BEARING SYSTEM FOR HIGH SPEED RADIO CONTROLLED TOY VEHICLES

(75) Inventor: Ping Juz Huang, Tai Po (HK)

(73) Assignee: Echo Toys Ltd., Hong Kong (HK)

( * ) Notice: Under 35 U.S.C. 154(b), the term of this patent shall be extended for 0 days.

(21) Appl. No.: 09/267,823

(22) Filed: Mar. 12, 1999

(51) Int. Cl.⁷ ................................................ F16C 43/04
(52) U.S. Cl. ............................................ 384/537; 384/544
(58) Field of Search .................................. 384/537, 544, 384/515, 513, 543

(56) References Cited

U.S. PATENT DOCUMENTS

| | | | | |
|---|---|---|---|---|
| Re. 24,686 | * | 8/1959 | Williams | 384/515 |
| 592,935 | * | 11/1897 | Misner et al. | 384/544 |
| 596,984 | * | 1/1898 | Danielson | 384/544 |
| 918,600 | * | 4/1909 | Schacht | 384/515 |
| 1,035,421 | * | 8/1912 | Coppins | 384/544 |
| 2,635,018 | * | 4/1953 | Palumbo | 384/515 |
| 2,866,672 | * | 12/1958 | Black | 384/515 |
| 3,619,017 | * | 11/1971 | Robinson et al. | 384/513 |
| 3,937,535 | * | 2/1976 | Ladin | 384/544 X |
| 4,765,688 | * | 8/1988 | Hofmann et al. | 384/544 X |
| 4,964,742 | * | 10/1990 | Kagawa et al. | 384/515 |
| 5,590,967 | * | 1/1997 | Kapaan | 384/544 X |

* cited by examiner

*Primary Examiner*—Charles A Marmor
*Assistant Examiner*—Ha Ho
(74) *Attorney, Agent, or Firm*—Kirschstein, et al.

(57) ABSTRACT

Friction-reducing bearings on the front and rear axles of a radio controlled, toy vehicle enable smooth driving of the vehicle, even at high speeds. Each bearing includes an annular track in which a plurality of freely revolving, hard metal balls is contained.

7 Claims, 3 Drawing Sheets

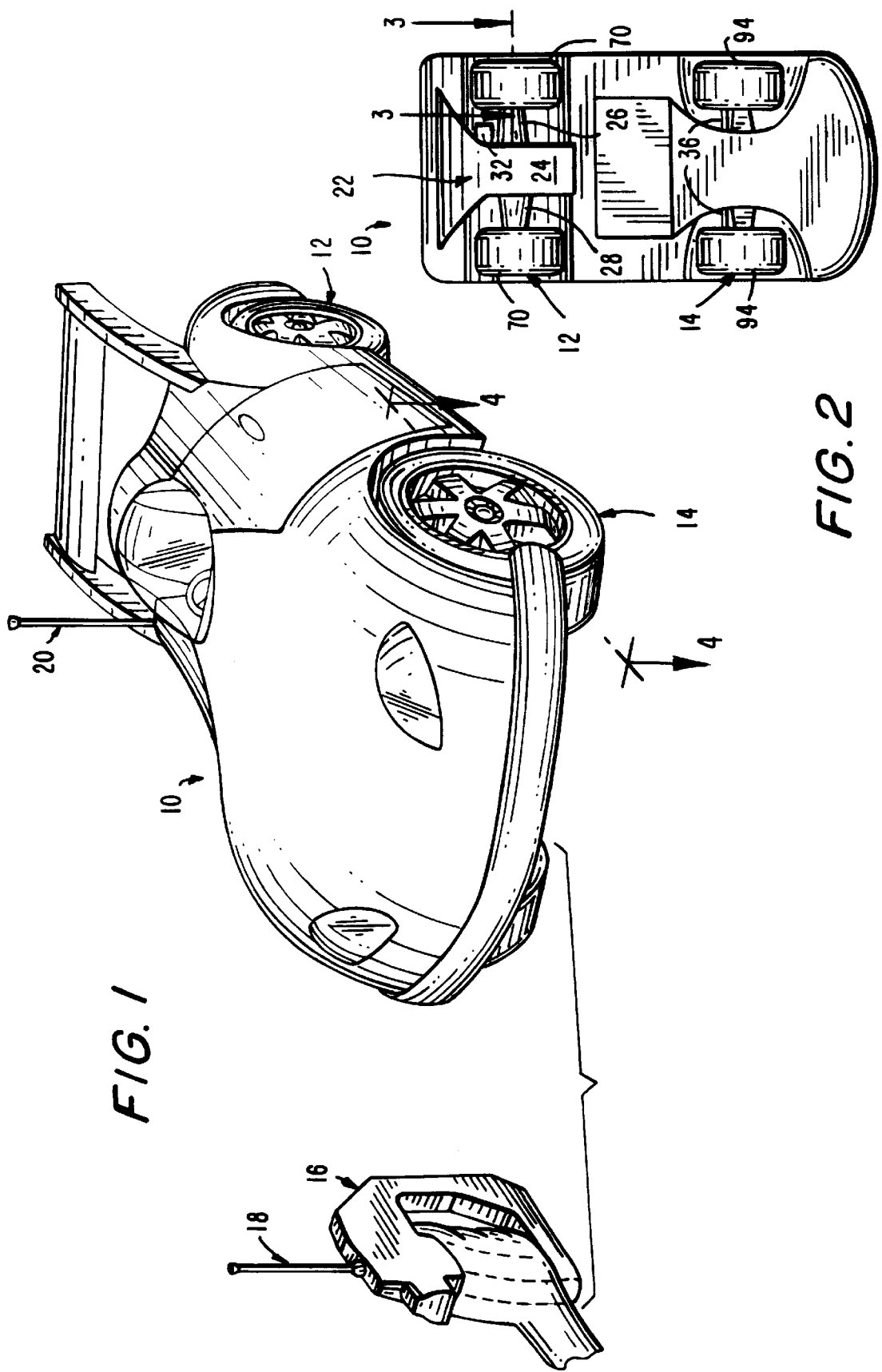

WHEEL BEARING SYSTEM FOR HIGH SPEED RADIO CONTROLLED TOY VEHICLES

BACKGROUND OF THE INVENTION

1. Field of the Invention

This invention generally relates to radio controlled, toy vehicles having front and rear wheels whose movements are controlled by radio frequency signals generated by a wireless transmitter remote from the vehicle and, more particularly, to a wheel bearing system for reducing friction on the axles on which the wheels are mounted, especially during high speed motion of the vehicle.

2. Description of the Related Art

Radio controlled, toy vehicles have on-board antennas for receiving radio frequency control signals generated by antennas on hand-held, wireless transmitters. The control signals include drive signals for moving the vehicle forward or backward, and steering signals for moving the vehicle toward the right or left during either forward or backward movement. The control signals are processed by on-board control circuitry to activate on-board DC motors. Transmissions and gear boxes are employed for transmitting the mechanical energy produced by the motors to the wheels. High gear ratios for the gear boxes enable the vehicles to move at relatively high speeds, thereby increasing the entertainment value of such vehicles.

High speed operation of such vehicles, however, causes the rear axles on which the rear wheels are mounted, and the front axles on which the front wheels are mounted, to vibrate and shake, thereby causing the vehicles to not run smoothly even over smooth surfaces. U.S. Pat. No. 3,473,259 is an example of a toy vehicle wheel and journal bearing construction.

OBJECTS OF THE INVENTION

Accordingly, it is a general object of this invention to enable radio controlled, toy vehicles to be driven smoothly at high speeds.

More particularly, it is an object of the present invention to reduce friction on the rear and front axles of such toy vehicles.

It is another object of this invention to resist vibrations and shaking of the rear and front axles during high speed movement of such vehicles.

SUMMARY OF THE INVENTION

In keeping with the above objects and others which will become apparent hereafter, one feature of the present invention resides, briefly stated, in a wheel bearing system for a high speed, radio controlled toy vehicle having front and rear wheels whose movements are controlled by radio frequency signals generated by a wireless transmitter remote from the vehicle.

The system comprises an on-board, rear casing having a pair of tubular extensions extending in opposite directions along a rear axis, and a pair of abutment walls. Each abutment wall is located within a respective extension and extends along a transverse axis generally perpendicular to the rear axis.

The system also includes a pair of apertured, annular, first track elements. Each first track element is mounted within a respective extension and abuts against a respective abutment wall. A pair of drive axles is mounted on the rear casing and extends in opposite directions along the rear axis for driving the rear wheels. Each drive axle extends with clearance through a respective first track element and has an outer shaft portion that extends beyond a respective extension. A pair of rear rims supports the rear wheels. Each rear rim is mounted on a respective outer shaft portion.

The system further includes a pair of annular, second track elements. Each second track element is mounted within a respective extension and is in force-transmitting engagement with a respective rear axle. Each second track element within a respective extension bounds an annular track with a respective first track element within the respective extension.

In accordance with this invention, a plurality of freely revolving, rigid balls is mounted within a respective track and rollably bears against the respective first and second track elements that bound the respective track, for reducing friction on the rear axles during high speed motion of the toy vehicle.

In the preferred embodiment, each outer shaft portion has an end bore. A pin extends through a respective rear rim and into the bore of a respective outer shaft portion.

Also, in the preferred embodiment, each first track element has a transverse base portion that engages the respective abutment wall, and a skirt portion that extends along the rear axis within the respective extension. Each second track element has an axial part that engages the respective rear axle, and a transverse part that extends along the transverse axis away from the respective axial part. The balls simultaneously engage the transverse base portion, the skirt portion, the axial part and the transverse part of the track elements. Each drive axle has a polygonal section within the respective extension. Each second track element has a polygonal aperture of complementary contour to the polygonal section of the respective rear axle.

As for the front wheels, the system further comprises a pair of front rims for supporting the front wheels. Each front rim has a tubular hub. A pair of front axles is mounted on the vehicle. Each front axle extends through a respective hub along a front axis.

In the preferred embodiment, each hub includes a blind bore having an apertured side wall which extends transversely of the front axis, and an apertured disc which is spaced axially from the bottom wall to bound a compartment within the hub. A pair of apertured, annular, first track members is mounted within each compartment. One of the first track members abuts against the side wall. The other of the first track members abuts against the disc. Each front axle extends with clearance through the disc, the track members and the side wall of each hub.

The preferred embodiment further comprises an apertured, annular, second track member which is mounted in each hub between the pair of first track members. The second track member has a first set of wall sections which bounds a first annular channel with said one of the first track members, and a second set of wall sections which bounds a second annular channel with said other of the first track members. Each front axle extends with clearance through the second track member.

In accordance with another feature of this invention, two groups of freely revolving, rigid balls are provided. Each group is mounted within a respective channel and rollably bears against the respective first and second track members that bound the respective channel, for reducing friction on the front axles during high speed motion of the toy vehicle.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a radio controlled, toy vehicle controlled by a hand-held remote transmitter and equipped with a wheel bearing system in accordance with this invention;

FIG. 2 a bottom plan view of the vehicle of FIG. 1;

DETAILED DESCRIPTION OF THE PREFERRED EMBODIMENTS

Figure 3:
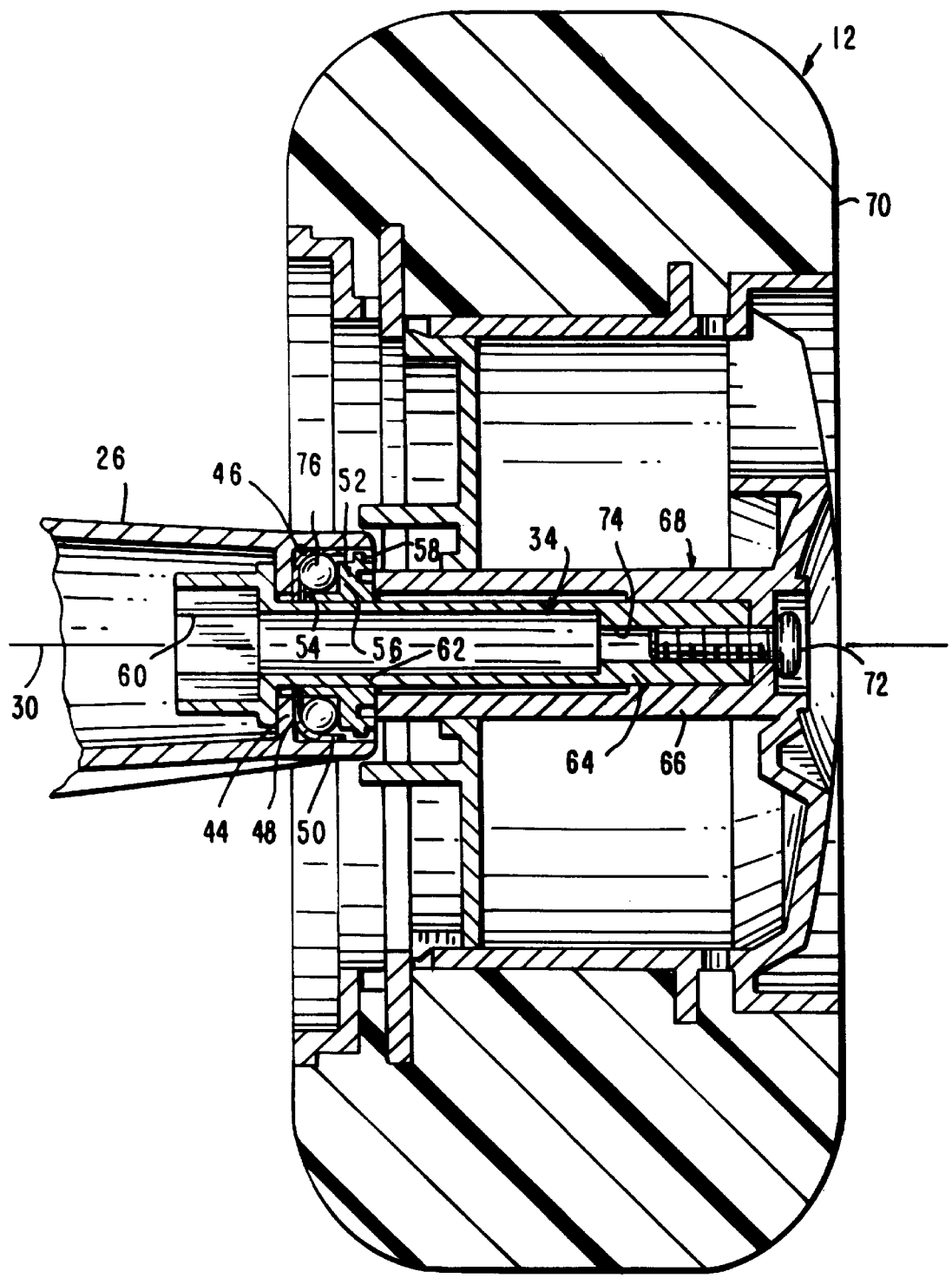
FIG. 3 is a sectional view taken on line 3—3 of FIG. 2.

Referring now to the drawings, reference numeral 10 in FIG. 1 generally identifies a radio controlled, battery-powered toy vehicle having rear wheels 12 and front wheels 14 whose movements are controlled by radio frequency control signals generated by a hand-held, battery-powered, transmitter 16 and broadcast by a transmitter antenna 18 to a receiver antenna 20 mounted on the vehicle 10. The control signals include drive signals for moving the vehicle forward or backward, and steering signals for moving the vehicle toward the right or left during the forward or backward movement.

A rear casing 22 is mounted at the rear of the vehicle between the rear wheels 12. The casing 22 has a central gear box 24 and a pair of tubular housing extensions 26, 28 extending in opposite directions along a rear axis 20 (see FIG. 3). Casing 22 also has an offset motor compartment 32 in which a reversible DC motor is mounted. The motor has a rotary drive shaft coupled to a gear train in the gear box. In turn, the gear train is coupled to a pair of rear drive axles 34 (only one shown in FIG. 3) which are mounted on the extensions 26, 28 and extend in opposite directions along the rear axis 30.

When drive signals are received by the receiver antenna 20, the drive signals are processed by a control circuit, and output drive signals are conveyed to the motor to turn its output drive shaft in a selected circumferential direction and at a selected rate of rotation. In turn, the motion of the drive shaft is transmitted through the gears to the rear axles 34 for turning the rear wheels 12. The ratio of the gears is made manually selectable for both low and high running speeds.

Figure 4:
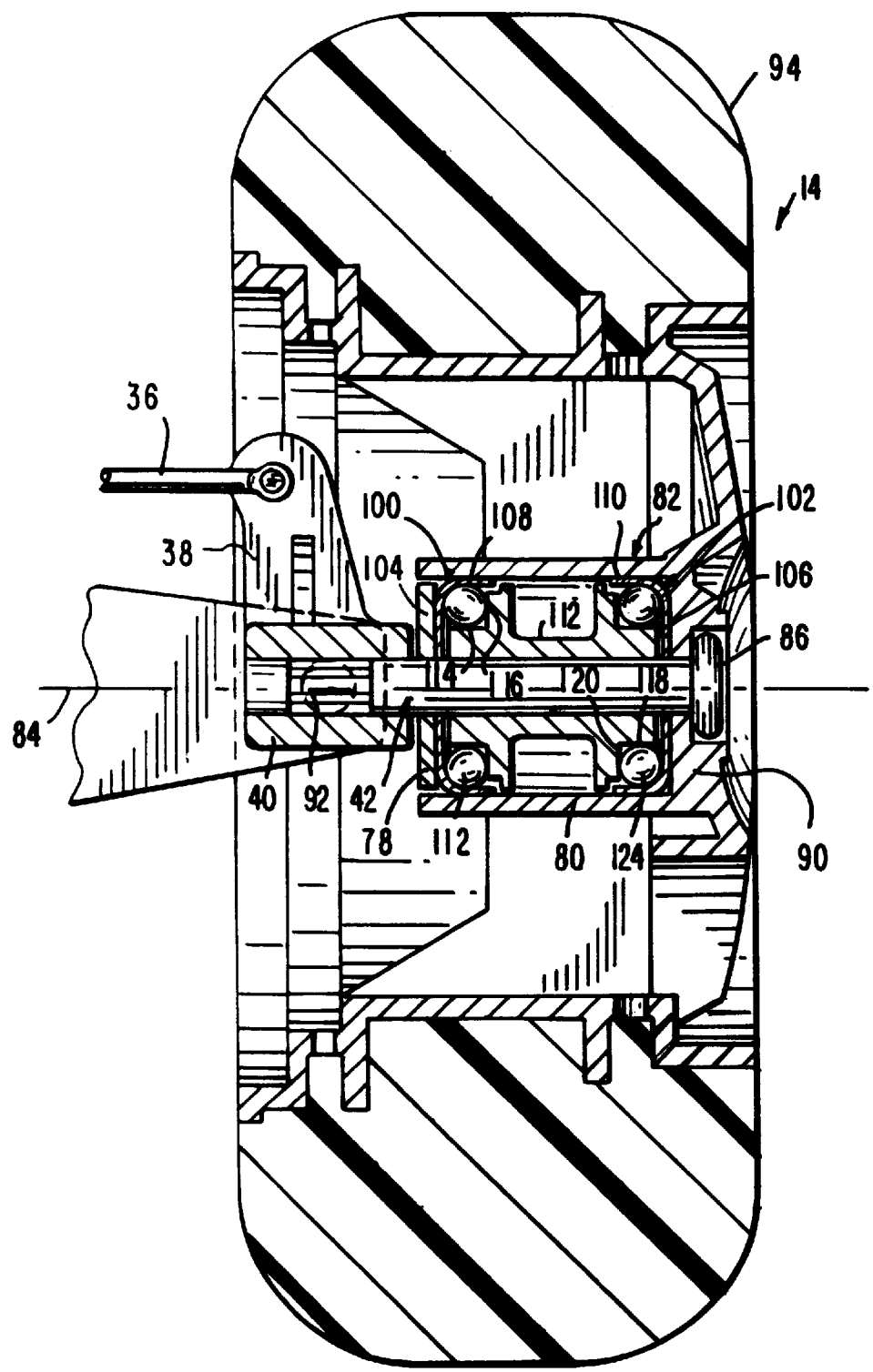
FIG. 4 is a sectional view taken on line 4—4 of FIG. 2.

When steering signals are received by the receiver antenna 20, the steering signals are processed by the control circuit, and output steering signals are conveyed to the motor and, in turn, to operate a steering linkage having opposite rods 36 (only one shown in FIG. 4). The rods 36 are pivotably coupled to a pair of steering arms 38 having cylindrical sections 40 in which a pair of front axles 42 are fixedly mounted for joint movement with the arms 38. The front wheels 14 are mounted on the front axles 42. The linkage is operated to swing the rods 36 toward the right or the left through a desired angular distance, thereby jointly moving the arms 38 and the front axles 42 for steering the front wheels.

In accordance with this invention, a wheel bearing system is provided for reducing the friction and vibration on the front axles 42 and the rear axles 34. As best seen in FIG. 3, the system includes, for each rear wheel 12, a centrally apertured, abutment wall 44 located within the extension 26 and extending in a plane perpendicularly of the rear axis 30. A centrally apertured, first track element 46 is mounted within each extension 26 and has a transverse base portion 48 engaging the abutment wall 44, and an axial annular skirt portion 50 engaging an inner, axial, annular surface of the extension 26.

A centrally apertured, second track element 52 is also mounted within each extension 26 and has an axial part 54 engaging a respective rear axle 34, and an annular transverse part 56 extending perpendicularly to the axial part. The base portion 48 and the transverse part 56 face each other, lie in mutual parallelism and are axially spaced apart by a predetermined axial distance. The skirt portion 50 and the axial part 54 also face each other, lie in mutual parallelism and are radially spaced apart by a predetermined radial distance. The base portion 48, skirt portion 50, transverse part 56 and axial part 54 together bound an annular track within the extension. The second track element also has a radial annular lip 58 that engages the inner surface of the extension and seals the track from the entry of contaminants, such as moisture and dust.

Each rear axle 34 has an inner coupling portion 60 which is coupled in a force-transmitting relationship with the transmission. Each rear axle 34 extends with clearance through the abutment wall 44 and the base portion 48 of the first track element 46. Each rear axle 34 drivingly engages the second track element 52 by configuring a central aperture of the second track element with a polygonal outline, and by configuring an outer peripheral surface of an intermediate portion 62 of the rear axle 34 with a complementary contour. Each rear axle 34 has an outer shaft portion 64 which extends into a tubular hub 66 of a rear rim 68 on which a rubber tire 70 of the rear wheel 12 is mounted. A pin 72 is press-fitted into a bore 74 at the outer shaft portion 64 to retain the rear rim 68 on the rear axle 34.

A plurality of freely revolving, rigid balls 76, preferably constituted of metal, is provided within each annular track. The balls 76 rollably bear against the base portion 48, skirt portion 50, axial part 54 and transverse part 56. The first and second track elements are also preferably constituted of metal. The balls 76 reduce the friction on each rear axle 34 as it rotates and drives the rear wheels 12.

The wheel bearing system includes, for each front wheel 14, a centrally apertured disc 78 mounted at an axial end of a tubular hub 80 of a front rim 82 for each front wheel 14. The hub 80 has an apertured side wall 90 through which each front axle 42 extends along a front axis 84. An outer end of the front axle 42 has a head 86 to retain the front rim 82 axially adjacent the cylindrical section 40 in which an opposite inner end 92 of the front axle 42 is press-fitted. Preferably, the inner end 92 has axial splines. A rubber tire 94 is mounted on each front rim 82.

Each disc 78 and side wall 90 are spaced axially apart to bound a compartment within the hub 80. A pair of centrally apertured, first track members 100, 102 are mounted within each compartment in a mirror symmetrical relationship. First track members 100, 102 have radial base parts 104, 106 and axial skirt parts 108, 110.

An apertured, second track member 112 is mounted within each compartment between a pair of first track members 100, 102. The second track member 112 has a first set of wall sections, including an axial section 114 and a radial section 116, that bound a first annular channel with the axial skirt part 108 and the radial base part 104. The second track member 112 also has a second set of wall sections, including an axial section 118 and a radial section 120, that bound a second annular channel with the axial skirt part 110 and the radial base part 106. Each front axle 42 extends with clearance through the second track member 112.

Two groups of freely revolving, rigid balls 122, 124, preferably constituted of metal, are provided within the annular channels in each hub 80. The balls 122, 124 rollably bear against the first and second track members that bound the respective channels. The first and second track members are also preferably constituted of metal. The balls 122, 124 reduce the friction on each front axle 42 as the front wheels 14 turn about the front axles, especially during high speed motion of the toy vehicle.

The speed at which the described vehicle can reach is higher than that for other radio controlled vehicles that do not have the wheel bearing system of this invention.

It will be understood that each of the elements described above, or two or more together, also may find a useful application in other types of constructions differing from the types described above.

While the invention has been illustrated and described as embodied in a wheel bearing system for high speed, radio controlled toy vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims.

I claim:

1. A wheel bearing system for a radio controlled, toy vehicle having front and rear wheels whose movements are controlled by radio frequency signal generated by a wireless transmitter remote from the vehicle, the system comprising:
   a) an on-board, rear casing having a pair of tubular extensions integral with the casing and extending in opposite directions along a rear axis, and a pair of abutment walls, each abutment wall being integral with, and located within, a respective extension and extending along a transverse axis generally perpendicular to the rear axis;
   b) a pair of apertured, annular, first track elements, each first track element being mounted within the respective extension and having a transverse base portion abutting against a respective abutment wall, and a skirt portion extending along the rear axis within the respective extension;
   c) a pair of rear axles mounted on the rear casing and extending in opposite directions along the rear axis, for driving the rear wheels, each rear axle extending with clearance through a respective first track element and having an outer shaft portion that extends beyond the respective extension;
   d) a pair of rear rims for supporting the rear wheels, each rear rim being mounted on a respective outer shaft portion;
   e) a pair of annular, second track elements, each second track element being mounted within the respective extension and having an axial part being in force-transmitting engagement with a respective rear axle, and a transverse part extending along the transverse axis away from the respective axial part, each second track element within the respective extension bounding an annular track with the respective first track element within the respective extension; and
   f) a plurality of freely revolving, rigid balls within a respective track and rollably bearing against the transverse base portion, the skirt portion the axial part and the transverse part of the respective first and second track elements that bound the respective track, for reducing friction on the rear axles during motion of the toy vehicles each ball having a diameter, and each transverse base portion extending along the transverse axis for a transverse distance greater than said diameter, and each skirt portion extending along the rear axis for an axial distance greater than said diameter.

2. The system according to claim 1, wherein each outer shaft portion has an end bore; and further comprising a pair of pins, each pin extending through a respective rear rim and into the bore of the respective outer shaft portion.

3. The system according to claim 1; and further comprising a pair of front rims for supporting the front wheels, each front rim having a tubular hub; and also comprising a pair of front axles mounted on the vehicle, each front axle extending through a respective hub along a front axis.

4. The system according to claim 3, wherein each hub includes a blind bore having an apertured side wall which extends transversely of the front axis, and an apertured disc spaced axially from the side wall to bound a compartment within the hub.

5. The system according to claim 4; and further comprising a pair of apertured, annular, first track members mounted within each compartment, one of the first track members abutting against the side wall, and the other of the first track members abutting against the disc; and wherein each front axle extends with clearance through the disc, the track members and the side wall of each hub.

6. The system according to claim 5; and further comprising an apertured, annular, second track member mounted in each hub between the pair of first track members; and wherein the second track member has a first set of wall sections bounding a first annular channel with said one of the first track members, and a second set of wall sections bounding a second annular channel with said other of the first track members; and wherein each front axle extends with clearance through the second track member.

7. The system according to claim 6; and further comprising two groups of freely revolving, rigid balls, each group being mounted within a respective channel and rollably bearing against the respective first and second track members that bound the respective channel, for reducing friction on the front axles during motion of the toy vehicle, each ball of a respective group having a predetermined diameter and wherein each of the first track members has a radial base part extending transversely of the front axis for a distance greater than said predetermined diameter, and wherein each of the first track members has an axial skirt part extending along the front axis for a distance greater than said predetermined distance.

* * * * *